United States Patent [19]

Nasu et al.

[11] Patent Number: 5,172,003
[45] Date of Patent: Dec. 15, 1992

[54] REFLEX TYPE OPTICAL SHEET SENSOR HAVING A DUSTPROOF PLATE WITH A ROUGHED SURFACE

[75] Inventors: Hideo Nasu; Kenji Umehara; Kazuhiro Kakuguchi, all of Kawasaki, Japan

[73] Assignee: Fujitsu Limited, Kawasaki, Japan

[21] Appl. No.: 796,977

[22] Filed: Nov. 25, 1991

[30] Foreign Application Priority Data

Nov. 27, 1990 [JP] Japan .................. 2-321313

[51] Int. Cl.⁵ ............................................. G01N 21/86
[52] U.S. Cl. .................................... 250/561; 250/216; 250/222.1
[58] Field of Search ...................... 250/561, 221, 222.1, 250/216, 223 R, 548, 577; 356/448, 445, 430

[56] References Cited

U.S. PATENT DOCUMENTS 4,540,887  9/1985  Minerd et al. .................. 250/223 R
4,701,613 10/1987  Watanabe et al. ................ 250/577

Primary Examiner—David C. Nelms
Assistant Examiner—Que T. Le
Attorney, Agent, or Firm—Nikaido, Marmelstein, Murray & Oram

[57] ABSTRACT

An optically transparent dustproof plate provided to a reflex type optical sheet sensor being for detecting passage of a sheet, transferred in front of the sheet sensor, by irradiating light from a light source provided in the sheet sensor to the sheet and receiving light reflected from the sheet at a light sensor provided in the sheet sensor, the sheet sensor being for protecting the light source and the light sensor from dust and having an outer surface, which faces outside of the dustproof plate, roughed for dispersing the irradiating light so as to decrease light reflected at the outer surface and received to the light sensor and an inner surface, which faces inside of the sheet sensor, inclined against the irradiating light so as to prevent light reflected at the inner surface from directing to the light sensor.

6 Claims, 8 Drawing Sheets

REFLEX TYPE OPTICAL SHEET SENSOR HAVING A DUSTPROOF PLATE WITH A ROUGHED SURFACE

BACKGROUND OF THE INVENTION

1. Field of the Invention

The present invention relates to a reflex type optical sheet sensor provided in a serial printer, and in particular, to an optically transparent dustproof plate provided in the reflex type optical sheet sensor.

2. Description of the Related Art

Recently, a serial printer, which has an another name of a dot matrix printer, is vigorously used with an electrical office equipment such as a word processor or a personal computer. The serial printer is for printing characters and/or images on paper. Generally, the serial printer uses two kinds of paper, a sheet of roll paper and a sheet of cut paper. The present invention relates to both and a word of "sheet" is used for the paper hereinafter. When the serial printer performs printing on a sheet, a foremost end and an endmost end of the sheet are required to be detected on a transfer way of the sheet in the serial printer. The detection of both ends, which will be called "sheet-ends" hereinafter, is for confirming whether the sheet is ready to be printed in the serial printer, and in particular, the detection of the foremost sheet-end is important for making the serial printer determine a start position of printing from the foremost sheet-end.

The sheet-ends can be detected by a mechanical switch such as a micro-switch. However, the mechanical switch causes mechanical trouble such as hurting the surface of the sheet or offering resistance against movement of the sheet transferred. Therefore, at the present time, an optical switch tends to be applied instead of the mechanical switch. A sheet sensor for the optical switch is called an optical sheet sensor. The sheet-ends are optically sensed by using light which is sent from a light source to a light sensor of the optical sheet sensor. When light is used, there are two ways of sensing the sheet-ends, one is a way of interrupting a beam of the light by the transferred sheet and the other is a way of using reflection of the light from the surface of the sheet transferred. Since the latter has an advantage of occupying a small space in the serial printer in comparison with the former, in other words, an advantage of making the serial printer compact, the latter is now used mostly. Since the present invention relates to the latter, the sheet sensor of the present invention will be called "reflex type optical sheet sensor" or simply "reflex type sheet sensor" hereinafter.

Figure 1:
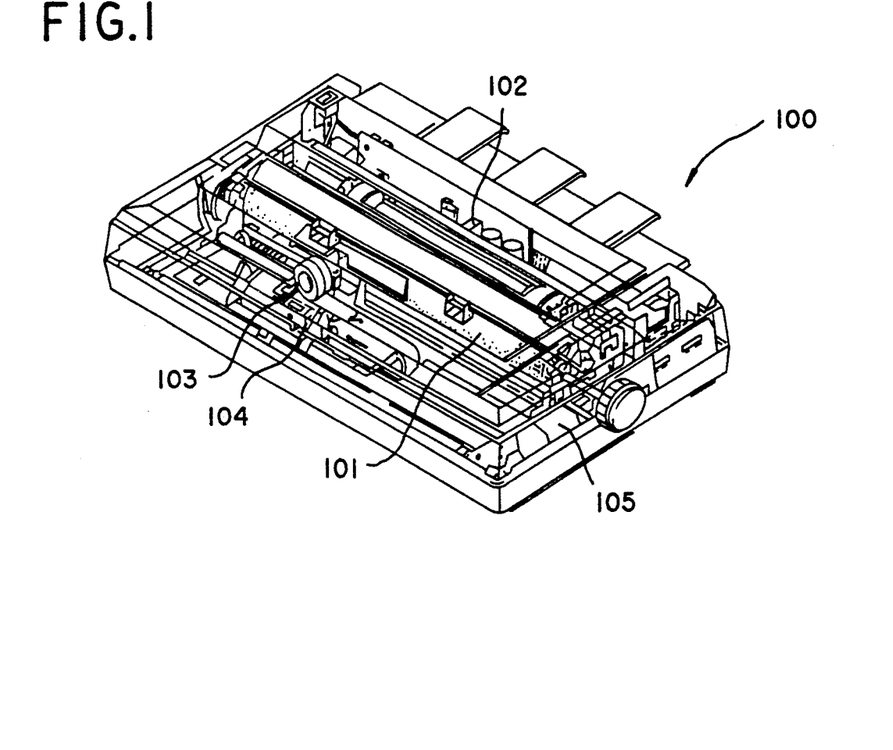
FIG. 1 is a perspective view of a typical serial printer using a reflex type sheet sensor.
Figure 2:
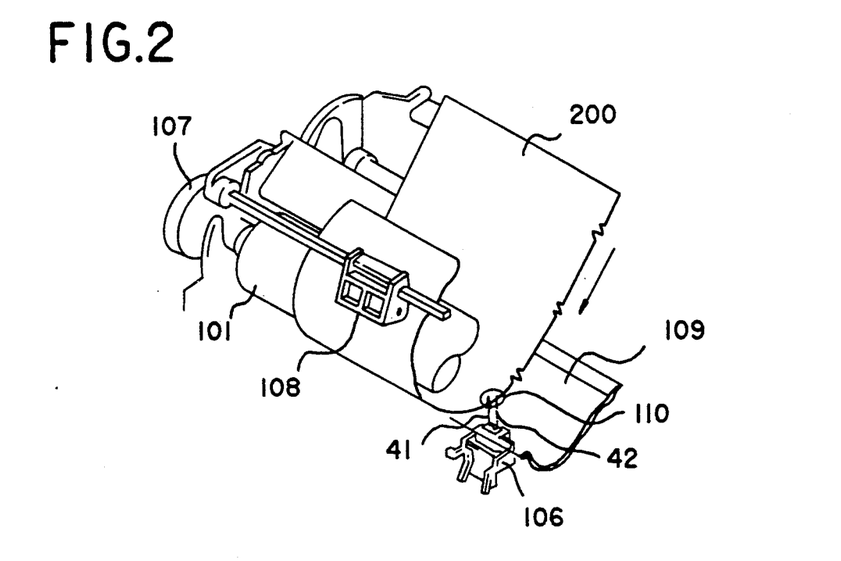
FIG. 2 is a partial perspective view of the serial printer in FIG. 1, for showing operation of the reflex type sheet sensor.

FIG. 1 is a perspective view of a typical serial printer 100 and FIG. 2 is a partial perspective view representing the operation of a reflex type sheet sensor 106 provided in serial printer 100 in FIG. 1. As shown in FIG. 1, serial printer 100 consists of a platen 101 having a cylindrical surface colored black, a main drive unit 102 for turning platen 101, a printing head 103 for performing printing on a sheet 200 (not depicted in FIG. 1 but depicted in FIG. 2) wound around the cylindrical surface of platen 101, a carriage 104 for carrying printing head 103 (mounted on carriage 104) so as to move printing head 103 in parallel with a rotating axis of platen 101, a carriage drive motor 105 for driving carriage 104 and reflex type sheet sensor 106 depicted in FIG. 2.

FIG. 2 shows reflex type sheet sensor 106 provided under platen 101. In FIG. 2, the same reference numeral as in FIG. 1 designates the same unit or part as in FIG. 1. When sheet 200 is fed into serial printer 100, sheet 200 is wound on the cylindrical surface of platen 101 by operating a sheet feed gear 108, passing threw a gap provided between the cylindrical surface of platen 101 and an inner cylindrical surface of a sheet cradle 109. The sheet 200 is held against the cylindrical surface of platen 101 tightly by a bail roller 108. Then, printing is performed on sheet 200 by the printing head 103 mounted on carriage 104. When sheet 200 is fed into the gap, sheet 200 is detected by a light beam 41 sent from reflex type sheet sensor 106. As shown in FIG. 2, a light pass hole 110 is provided to sheet cradle 109 so that light beam 41 goes therethrough. When there is no sheet 200 in the gap, light beam 41 is sent directly to the cylindrical surface of platen 101 through light pass hole 110 and absorbed by the blacked cylindrical surface. However, when sheet 200 is fed in the gap so as to cover light pass hole 110, light beam 41 is reflected by the surface of sheet 200, sending reflected light 42 back to reflex type sheet sensor 106 as shown in FIG. 2. Providing reflex type sheet sensor 106 thus, the sheet-ends of sheet 200 can be detected.

Figure 3:
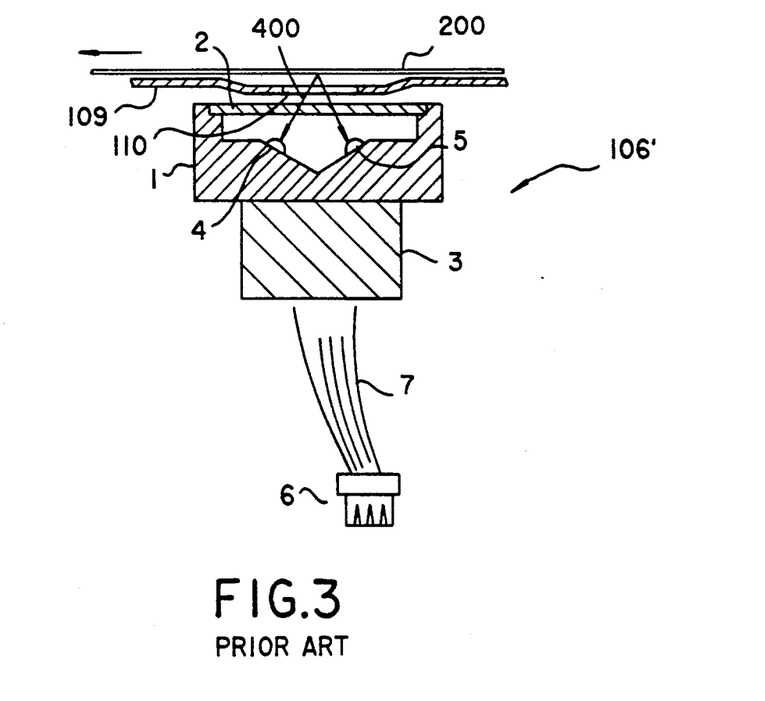
FIG. 3 is a partially cross sectional view of a prior art reflex type sheet sensor equipped to the serial printer, including an optically transparent dustproof plate having flat outer and inner surfaces parallel to each other, for showing the function of the sheet sensor.

FIG. 3 is a partially cross sectional view of a reflex type sheet sensor 106' of the prior art, for showing that reflex type sheet sensor 106' performs sheet sensing by using light beam 41 emitted therefrom. In FIG. 3, the same reference numeral as in FIG. 2 designates the same part as in FIG. 2. As shown in FIG. 3, reflex type sheet sensor 106' consists of an optical device housing unit 1, an intermediate circuit board 3 attached to light device housing unit 1 and an interconnecting cable 7 connecting intermediate circuit board 3 to a main circuit board not depicted in FIG. 3, through a connector 6 attached to interconnecting cable 7. The light device housing unit 1 has concave structure in which a light source 4 and a light sensor 5 are provided on an inside wall of the concave structure. Since many sheets 200 are transferred through the narrow gap between platen 101 and sheet cradle 109 near by reflection type sheet sensor 106', a lot of paper dust are produced around reflection type sheet sensor 106'. Therefore, an aperture of the concave structure is covered by an optically transparent dustproof plate 2 for keeping light source 4 and light sensor 5 clean from dust. When sheet 200 appears at light pass hole 110, a ray of light beam 41 (see FIG. 2) emitted from light source 4 goes to the surface of sheet 200 through dustproof plate 2 and light pass hole 109 and reflected back to light sensor 5 through reflected light pass hole 109 and dustproof plate 2. The ray emitted from light source 4 and reflected back to light sensor 5 from sheet 200 is numbered as "ray 400" in FIG. 3.

PROBLEM OF THE PRIOR ART

Figure 4:
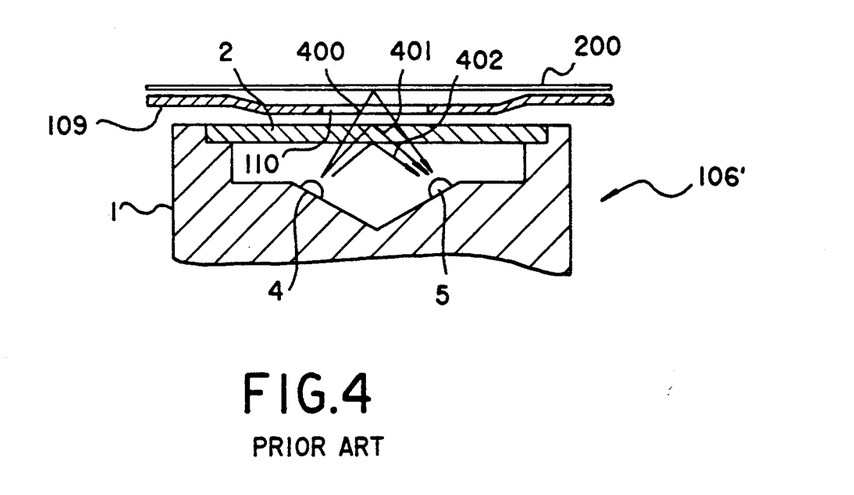
FIG. 4 is a partially cross sectional view of the prior art reflex type sheet sensor shown in FIG. 3, for illustrating rays emitted from a light source in the sheet sensor and reflected from a sheet and the outer and inner surfaces of the dustproof plate.
Figure 5:
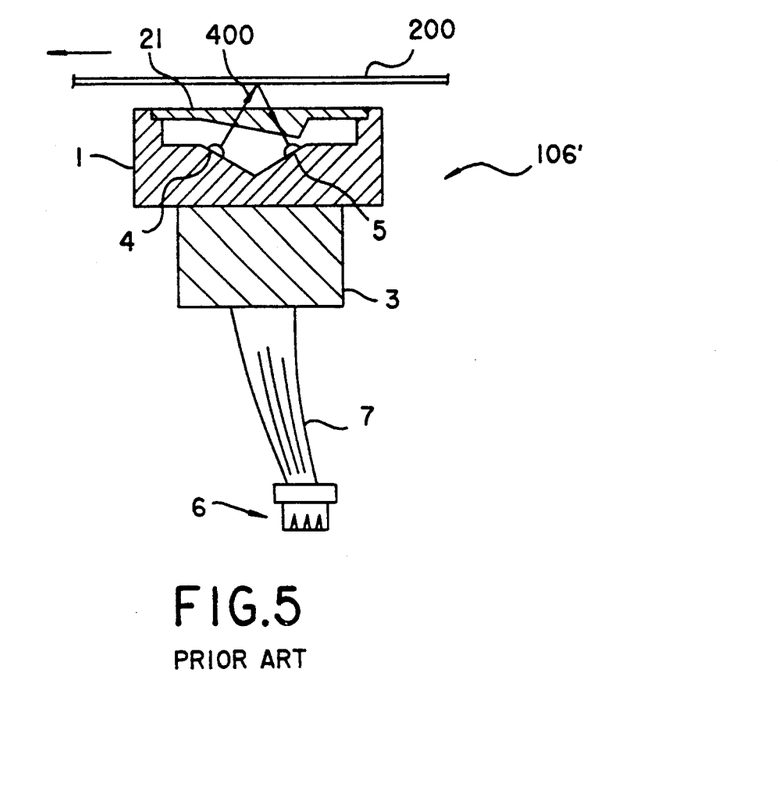
FIG. 5 is a partially cross sectional view of another prior art reflex type sheet sensor including a dustproof plate having an inclined inner surface, for showing the function of the sheet sensor.
Figure 6:
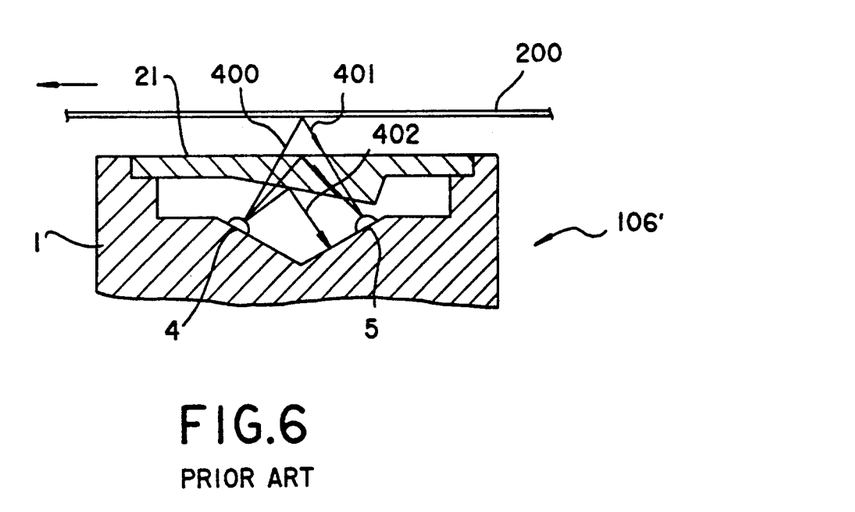
FIG. 6 is a partially cross sectional view of the prior art reflex type sheet sensor shown in FIG. 5, for illustrating rays emitted from a light source in the sheet sensor and reflected from the sheet and the outer and inner surfaces of the dustproof plate.

However, some rays of light beam 41 are reflected at outer and inner surfaces of dustproof plate 2 and sent to light sensor 5 as shown in FIG. 4. In FIG. 4, a part of FIG. 3 is illustrated for showing a ray 401 reflected from the outer surface and a ray 402 reflected from the inner surface of the dustproof plate 2. In FIG. 4, the same reference numeral as in FIG. 3 designates the same part or ray as in FIG. 3. Because of existing rays 401 and 402, there were two problems due to rays 401 and 402 that the ability of light sensor 5 for sensing ray 400 is decreased. In the two problems, a problem due to ray 402 was solved by inclining the inner surface so that incidence angles of rays from light source 4 at the inclined inner surface are smaller than those at the original inner surface parallel to the outer surface, as shown in FIGS. 5 and 6. FIG. 6 illustrates a part of FIG. 5 for illustrating a details of rays reflected by sheet 200 and a dustproof plate 21 having the inclined inner surface. In FIGS. 5 and 6, sheet cradle 109 is omitted to be depicted respectively for simplicity. In FIG. 5, the same reference numeral as in FIG. 3 designates the same part or ray as in FIG. 3, and in FIG. 6 the same reference numeral as in FIG. 5 designates the same part or ray as in FIG. 5. As shown in FIG. 6, ray 402 is reflected by the inclined inner surface so as not to direct to light sensor 5. Because, the incidence angle of ray 402 at the inclined inner surface is smaller than that in FIG. 4. This solution was found by Fujitsu Inc. when Fujitsu Inc. began to produce serial printer including sheet sensor 106' in 1987. Thus, the problem due to ray 402 was avoided. However, another problem due to ray 401 has been left.

SUMMARY OF THE INVENTION

Therefore, an object of the present invention is to decrease rays reflected to the light sensor from the outer surface of the dustproof plate in the reflex type sheet sensor.

Another object of the present invention is to increase the ability of the light sensor for sensing the ray reflected from the sheet.

Still another object of the present invention is to increase the reliability of sheet sensing performed by the reflex type sheet sensor.

The above objects are achieved by making the outer surface of the dustproof plate rough for dispersing a ray arrived at the outer surface so that rays reflected from the outer surface and sent to the light sensor are decreased.

DESCRIPTION OF THE PREFERRED EMBODIMENTS

Figure 7:
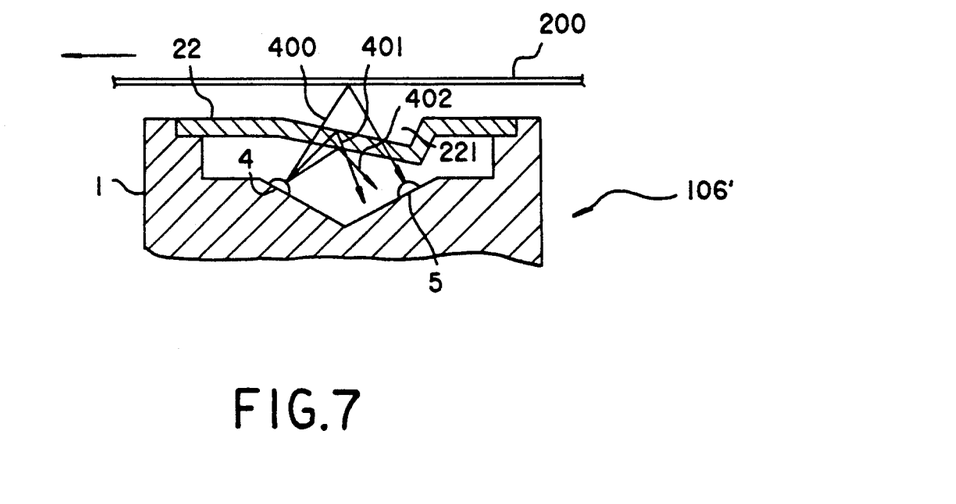
FIG. 7 is a partially cross sectional view of a reflex type sheet sensor including an improper dustproof plate having inclined outer and inner surfaces.
Figure 8:
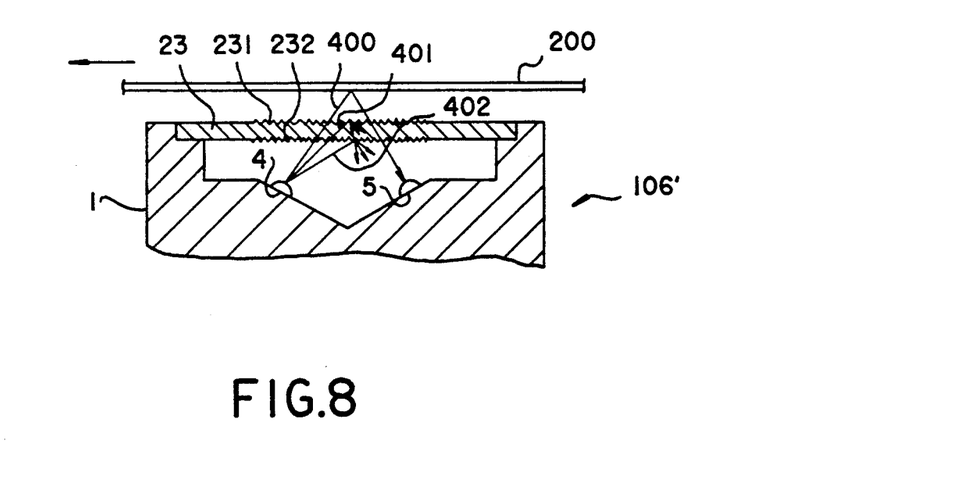
FIG. 8 is a partially cross sectional view of a reflex type sheet sensor including an improper dustproof plate having roughed outer and inner surfaces.

In order to decrease light reflection from a surface of an object, an anti-reflection layer for decreasing the light reflection is generally provided on the surface. The anti-reflection layer could be applied to the inner surface of the dustproof plate if only decrease of the light reflection is considered. However, the anti-reflection layer decreases a ray sent to the surface of the sheet and reflected to the light sensor through the dustproof plate respectively, which results in lowering the sheet sensing ability of the reflex type sheet sensor. Therefore, inclining the surface as done for the inner surface in FIGS. 5 and 6 is better than providing the anti-reflection layer thereon. Then, in the present invention, the inner surface is inclined as done in the prior art explained in reference to FIGS. 5 and 6. Similarly to the inner surface, the outer surface can be inclined for avoiding light reflection occurring therefrom. However, the outer surface cannot be inclined. Because, paper dust coming from the running sheet is collected in a depression 221 of the inclined outer surface as shown in FIG. 7, causing to intercept rays. In FIG. 7, sheet cradle 109 is omitted to be depicted, and the same reference numeral as in FIG. 6 designates the same ray or part as in FIG. 6. In FIG. 7, rays 401 and 402 are reflected at an inclined outer surface and the inner surface of a dustproof plate 22 so as not to be sent to light sensor 5 respectively. However, the paper dust coming from the running sheet 200 is collected in depression 221, resulting in intercepting ray 400. FIG. 8 shows a case of making the inner and outer surfaces rough. In FIG. 8, the same reference numeral as in FIG. 6 designates the same ray or part as in FIG. 6. In FIG. 8, roughed surfaces 231 and 232 are provided on the outer and inner surfaces of dustproof plate 23 respectively. The rays 401 and 402 are dispersed at roughed surfaces 231 and 232 respectively. However, ray 400 is also dispersed at the outer and inner surfaces, so that little ray 400 is sent to light sensor 5. This results in lowering the sheet sensing ability of light sensor 5.

Figure 9:
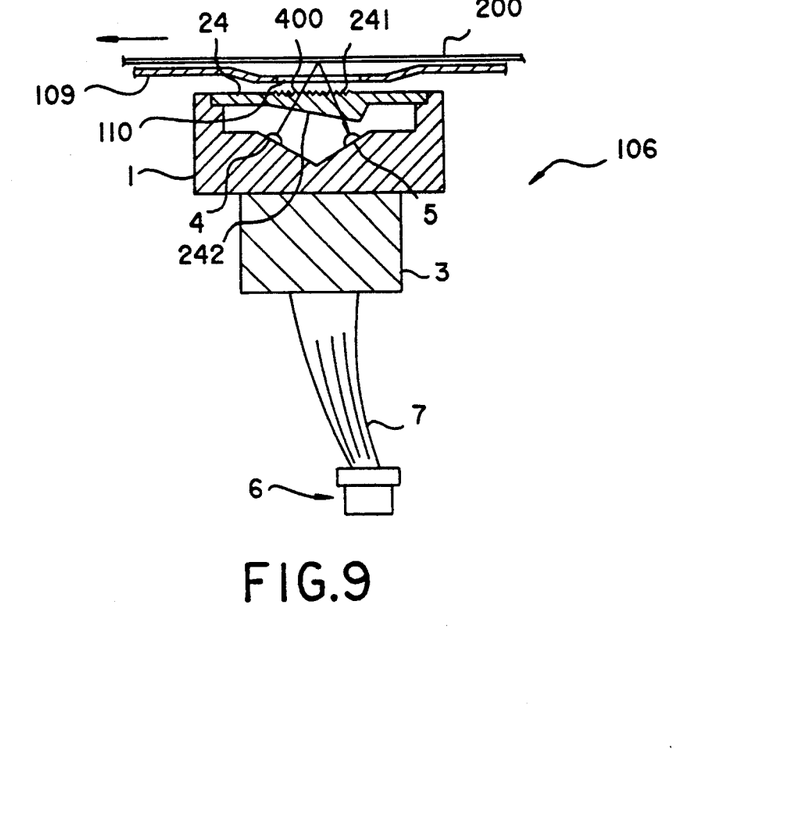
FIG. 9 is a partially cross sectional view of an invented reflex type sheet sensor including a dustproof plate having a roughed outer surface and an inclined inner surface, for showing the function of the invented sheet sensor.
Figure 10:
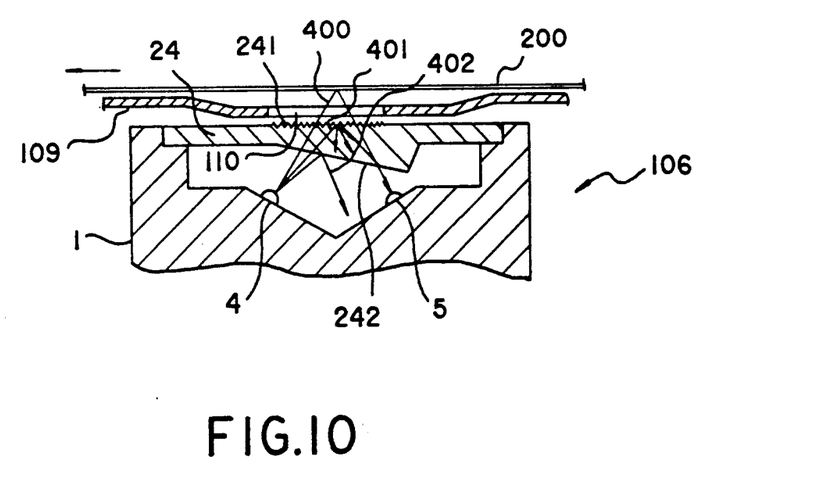
FIG. 10 is a partially cross sectional view of the invented reflex type sheet sensor shown in FIG. 9, for illustrating rays emitted from a light source in the sheet sensor and reflected from a sheet and the outer and inner surfaces of the dustproof plate.

As a result, in the present invention, the ray reflected from the outer surface to the light sensor is decreased by making the outer surface rough so that the ray is dispersed by the roughed outer surface as shown in FIGS. 9 and 10. In FIG. 9, the same reference numeral as in FIG. 3 designates the same ray or part as in FIG. 3, and in FIG. 10, the same reference numeral as in FIG. 4 designates the same ray or part as in FIG. 4. In FIGS. 9 and 10, ray 400 is emitted from light source 4 and sent to the surface of sheet 200 through a dustproof plate 24 having an inclined inner surface 242 and a roughed outer surface 241. The ray 400 arrived at the surface of sheet 200 is reflected therefrom and sent to light sensor 5 again through dustproof plate 24. Meanwhile, as shown in FIG. 10, ray 401 is dispersed at the roughed outer surface 241 so that little ray is sent to light sensor 5 and ray 402 is reflected from inclined inner surface 242 so as not to be sent to light sensor 5. Providing roughed outer surface 241 and inclined inner surface 242 to dustproof plate 24 thus, the rays reflected from the outer and inner surfaces of dustproof plate 24 are reduced but ray 400 is reflected from sheet 200 and sent to light sensor 5 not reduced so much as rays 401 and 402, which results in increasing the sheet sensing ability of reflex type sheet sensor 106.

Figure 12A:
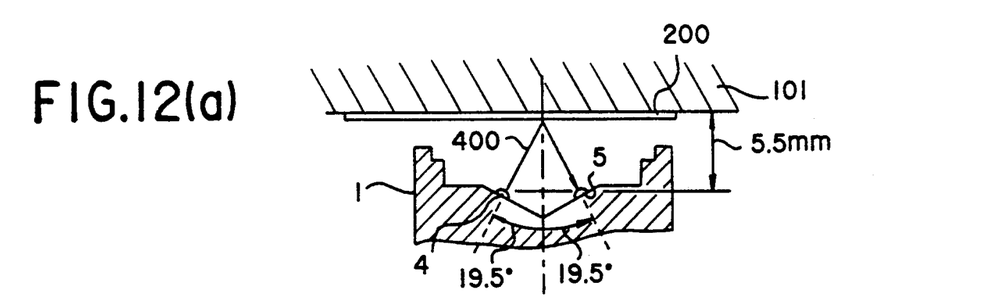
FIG. 12(a) is an illustration showing a partially cross sectional view of the sheet sensor having no dustproof plate, used for investigating the effect of the present invention.
Figure 12B:
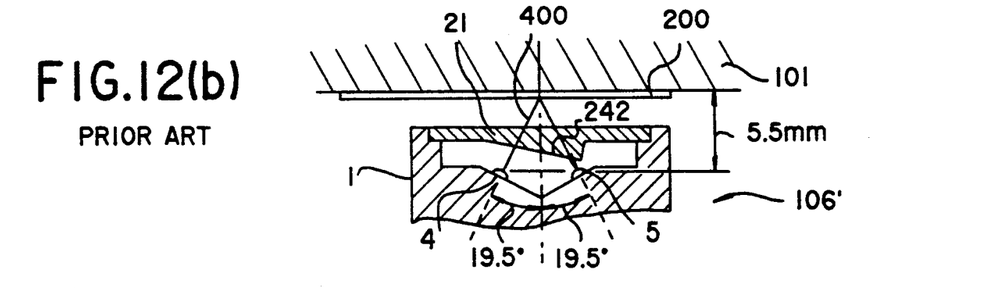
FIG. 12(b) is an illustration showing another partially cross sectional view of the prior art sheet sensor, used for investigating the effect of the present invention.
Figure 12C:
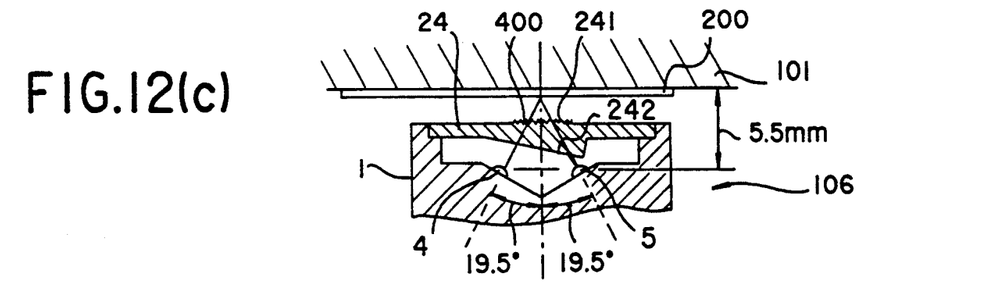
FIG. 12(c) is an illustration showing another partially cross sectional view of the firstly embodied sheet sensor, used for investigating the effect of the present invention.
Figure 13:
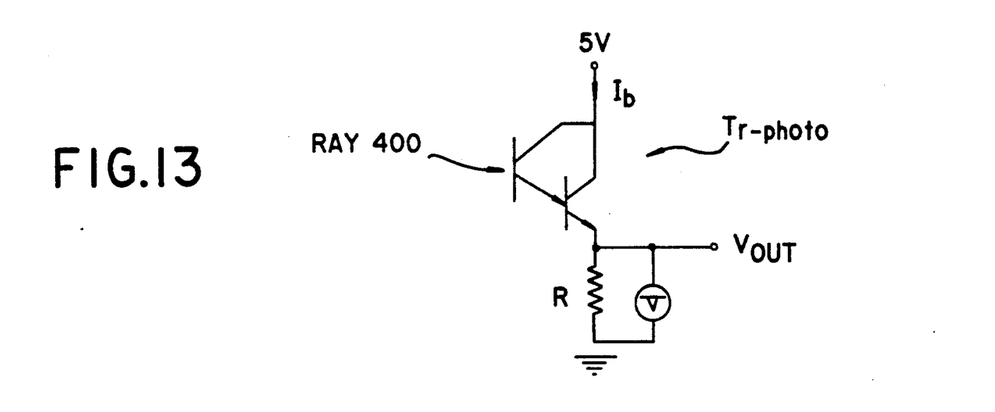
FIG. 13 is a circuit diagram of a light sensor.

The effect of the invented dustproof plate will be explained in reference to FIGS. 12(a), (b) and (c), FIG. 13 and FIG. 14. In order to investigate the effect of the present invention, the sheet sensor actually equipped to serial printer 100 is tested. The investigation is performed by using three sheet sensors having no dustproof plate as shown in FIG. 12(a), having prior art dustproof plate 106' as shown in FIG. 12(b) and having invented dustproof plate 106 as shown in FIG. 12(c), respectively. In FIGS. 12(a), (b) and (c), the same reference numeral as in FIGS. 6 and 10 designates the same part or ray as in FIGS. 6 and 10, and platen 101 having the blacked surface is shown in respective figure. As shown in FIGS. 12(a)–(c), light source 4 and light sensor 5 are arranged in a line parallel to the blacked surface of platen 101, having a distance of 5.5 mm from the blacked surface, and light source 4 and sensor 5 are separated to each other 19.5° from a center line shown by a one dot chained line in respective figure. A conventional pair of light source and sensor, named GP2L01FK (SHARP Inc. in Japan) is used for light source 4 and sensor 5. A typical circuit for the light sensor of GP2L01FK is shown in FIG. 13. In FIG. 13, a reference symbol $I_b$ is a bias current of a photo transistor $T_{r-photo}$ and $V_{out}$ is an output voltage appearing on a load resistor R when light sensor 5 receives light. In FIGS. 12(b) and 12(c), dustproof plate is made of plastic respectively, and roughed outer surface 241 in FIG. 12(c) is made so as to have roughness of 5 micro meter with a tolerance of plus minus 15%.

Figure 14:
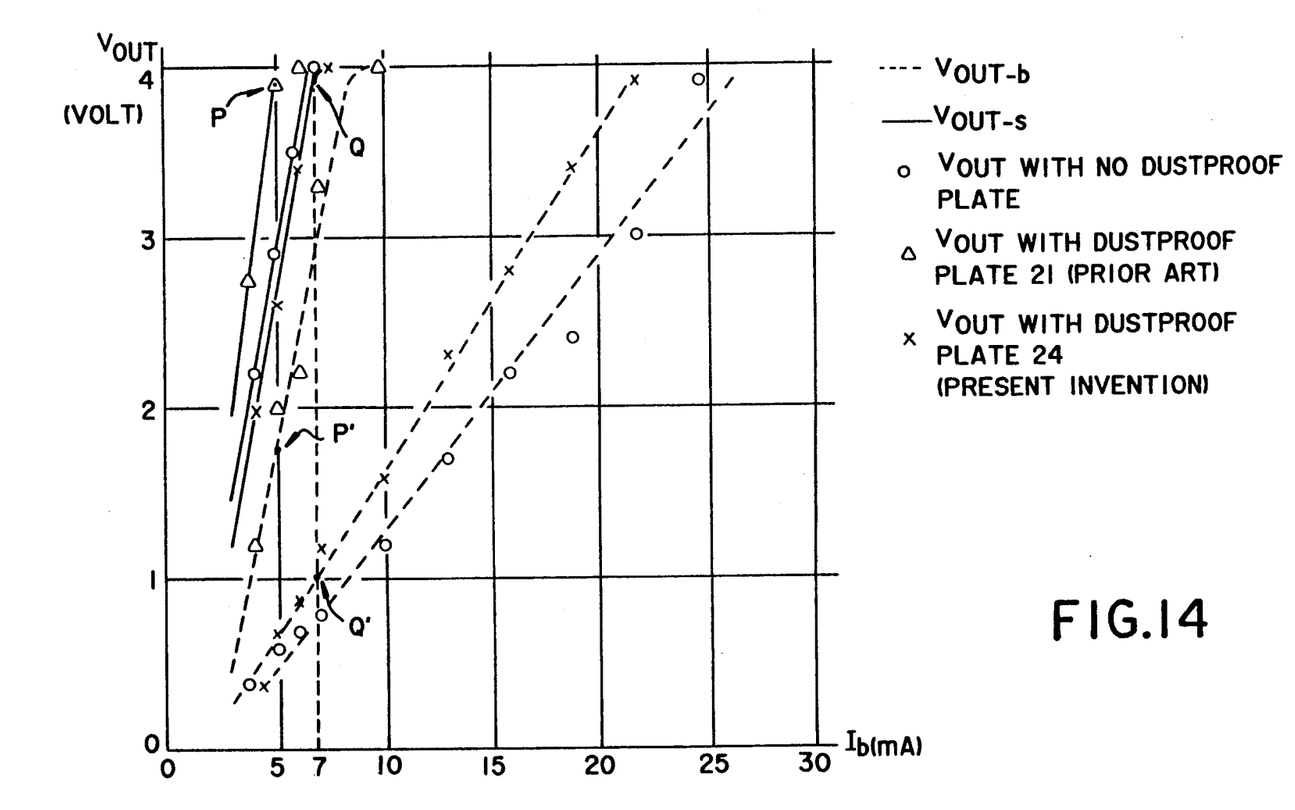
FIG. 14 is a graph of data, for showing the effect of the present invention.

FIG. 14 is a graph showing output voltages $V_{out}$s against the variation of bias current $I_b$ in case of FIGS. 12(a), (b) and (c). A circle mark, a triangle mark and a cross mark indicate $V_{out}$ in case of having no dustproof plate as shown in FIG. 12(a), having the prior art dustproof 21 as shown in FIG. 12(b) and having the invented dustproof plate 24 respectively. In these cases, dotted lines indicate trends of $V_{out}$s when no sheet 200 is fed in front of sheet layer 106' or 106 and solid lines indicate trends $V_{out}$s when sheet 200 is fed. Wherein, $V_{out}$s are obtained even in case of feeding no sheet 200 (dotted lines), which is because of that light is reflected from platen 101 though its surface is blacked. A detecting signal of sheet 200 is obtained by subtracting $V_{out}$ produced by light reflected from the blacked surface, from $V_{out}$ produced by light reflected from sheet 200. The former $V_{out}$ will be called "$V_{out-b}$" and the latter will be called "$V_{out-s}$" hereinafter. In FIG. 14, when $I_b$ is designated to a value, the detecting signal of the sheet in case of FIG. 12(b) can be obtained by subtracting $V_{out-b}$ on a dotted line of the circle marks from $V_{out-s}$ on a solid line of the circle marks, at the designated $I_b$. Same as the above, the detecting signals of the sheet in other cases of FIGS. 12(a) and (c) can be obtained. In FIG. 14, all solid and dotted lines saturate at approximately 4 v of $V_{out}$ because a power supply voltage onto the light sensor circuit is 5 v as shown in FIG. 13 and the power supply voltage 5 v is reduced to 4 v by a voltage drop due to the $T_{r-photo}$. Therefore, an optimum detection signal is obtained at an optimum $I_b$ just before each solid line tends to saturate.

The effect of the present invention can be obtained by comparing voltage differences, "$V_{out-s} - V_{out-b}$", in cases of FIGS. 12(b) and (c). In case of the prior art (FIG. 12(b)), the saturating $V_{out-s}$ is 3.9 v at the optimum $I_b$ of 5 ma as indicated by "P" on the solid line of the triangle marks in FIG. 14, and $V_{out-b}$ on the dotted line of the triangle marks is 1.75 v at the optimum $I_b$ of 5 ma as indicated by "P'". Therefore, the voltage difference, $V_{out-s} - V_{out-b'}$ in case of the prior art is 3.9 v − 1.75 v = 2.15 v. Meanwhile, in case of the present invention (FIG. 12(c)), the saturating $V_{out-s}$ is 3.9 v at the optimum $I_b$ of 7 ma as indicated by "Q" on the solid line of the cross marks, and $V_{out-b}$ on the dotted line of the cross marks is 0.7 v at the optimum $I_b$ of 7 ma as indicated by "Q'". Therefore, the voltage difference in case of the present invention is 3.9 v − 1 v = 2.9 v. Comparing the above voltage differences 2.15 v and 2.9 v, it can be said that the optimum detection signal is improved about 35% which is obtained from (2.9 v − 2.15 v)/2.15 v = 0.35. Incidently, in case of no dustproof plate (FIG. 12(a)), the voltage difference of (3.9 v − 0.75 v) = 3.15 v is obtained from the solid and dotted lines of the circle marks at an optimum $I_b$ of approximately 0.65 ma, with the same way of the above. This 3.15 v is an ideal value of the voltage difference. Therefore, it can be said that 2.9 v in the present invention is a value nearer to the ideal value than that in the prior art.

Figure 11:
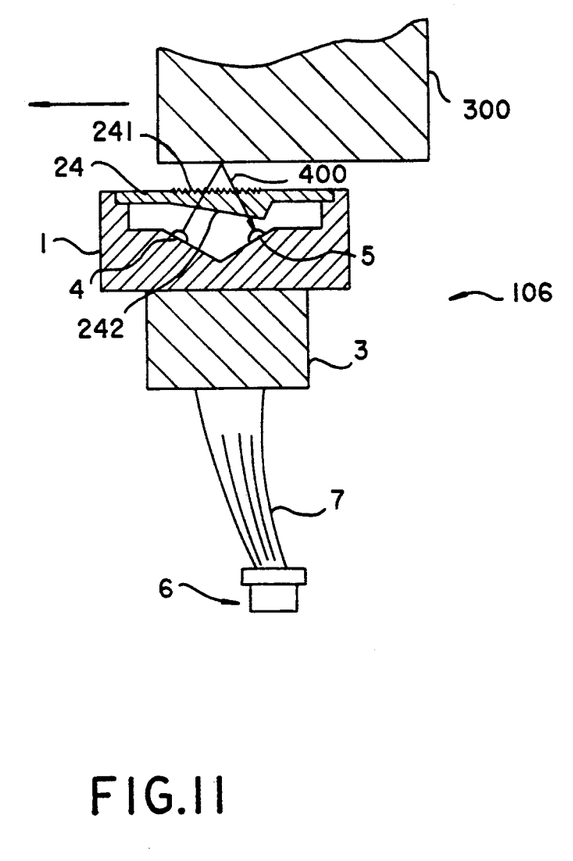
FIG. 11 is a partially cross sectional view of the invented reflex type sheet sensor shown in FIG. 9, used for detecting an object having surfaces capable of reflecting light.

In the above, reflex type sheet sensor 106 applied to serial printer 100 is explained as the preferred embodiment. However, the present invention is not limited to the reflex type sheet sensor for detecting the passage of sheets of paper. The present invention can be used for detecting the passage of sheets of other material as far as the sheet of other material has a surface capable of reflecting light. Further, the reflex type sheet sensor of the present invention can be used for detecting the passage of not only the sheet but also any other object having a surface capable of reflecting light as shown in FIG. 11. In FIG. 11, the same reference numeral as in FIG. 9 designates the same part or ray as in FIG. 9. In FIG. 11, reference numeral 300 is an object transferred in front of reflex type sheet sensor 106. The object 300 has a surface capable of reflecting light, so that ray 400 is emitted from light source 4, reflected from the surface of object 300 and sent to light sensor 5.

What is claimed is:

1. A reflex type optical object sensor (106) for optically detecting passage of objects (300) by irradiating light, which is emitted from the object sensor, on a surface of the object and receiving light reflected from the surface of the object, said object sensor comprising:

a light source (4) for emitting rays toward the surface of the object transferred in front of the object sensor;

a light sensor (5) for receiving rays reflected from the surface of the object;

housing means (1) for housing said light source and sensor, having an opening opened to the transferred object; and     an optically transparent dustproof plate (24) covering the opening for protecting said light source and said light sensor from dust, through which the emitted rays are sent out and the reflected rays are received, said dustproof plate comprising an outer surface, faced outside of said housing means, having a roughed surface (241) for dispersing the emitted rays so as to reduce rays reflected from the roughed surface and sent to said light sensor.

2. A reflex type optical object sensor according to claim 1, wherein said roughed surface of said outer surface of said optically transparent dustproof plate has roughness of 5 micro meter.

3. A reflex type optical object sensor according to claim 1, wherein said optically transparent dustproof plate further comprises an inner surface (242), faced inside of said housing means, inclined for preventing rays produced by reflecting the emitted rays from the inner surface, from directing to said light sensor.

4. A reflex type optical sheet sensor (106) provided in a serial printer, for optically detecting passage of sheets (200) of paper by irradiating light, which is emitted from the sheet sensor, on a surface of the sheet and receiving light reflected from the surface of the sheet, said sheet sensor comprising:

a light source (4) for emitting rays toward the surface of the sheet transferred in front of the sheet sensor;

a light sensor (5) for receiving rays reflected from the surface of the sheet;

housing means (1) for housing said light source and said light sensor, having an opening opened to the transferred sheet; and     an optically transparent dustproof plate (24) covering the opening for protecting said light source and said light sensor from dust, through which the emitted rays are sent out and the reflected rays are received, said dustproof plate comprising an outer surface, faced outside of said housing means, having a roughed surface (241) for dispersing the emitted rays so as to reduce rays reflected from the roughed surface and sent to said light sensor.

5. A reflex type optical object sensor according to claim 4, wherein said roughed surface of said outer surface of said optically transparent dustproof plate has roughness of 5 micro meter.

6. A reflex type optical sheet sensor according to claim 4, wherein said optically transparent dustproof plate further comprises an inner surface (242), faced inside of said housing means, inclined for preventing rays produced by reflecting the emitted rays from said inner surface, from directing to said light sensor.

* * * * *